Figure 1:
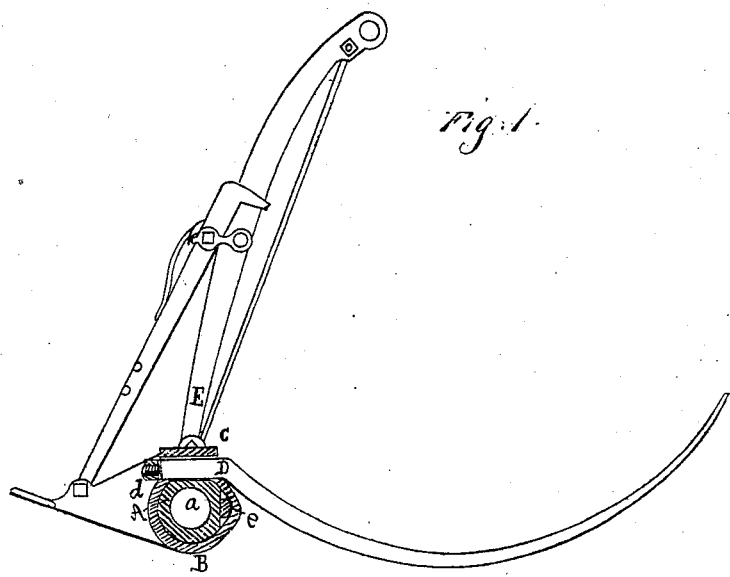
Figure 2:
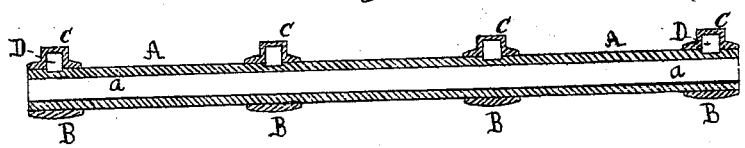

Walton & Brown,
Hay Fork.

No. 96,517. Patented Nov. 2 1869.

Witnesses.
Geo. H. Strong
Jno L. Boone

Inventor
Elisha Ward Walton
Andrew Jackson Brown
By their Att'ys
Dewey & Co.

United States Patent Office.

ELISHA WIARD WALTON AND ANDREW JACKSON BROWN, OF STOCKTON, CALIFORNIA; SAID A. J. BROWN ASSIGNS HIS RIGHT TO MATTESON & WILLIAMSON, OF SAME PLACE.

Letters Patent No. 96,517, dated November 2, 1869.

IMPROVEMENT IN HAY-FORKS.

The Schedule referred to in these Letters Patent and making part of the same.

*To all whom it may concern:*

Be it known that we, ELISHA WIARD WALTON and ANDREW JACKSON BROWN, of Stockton, county of San Joaquin, State of California, have invented an Improved Horse Hay and Grain-Fork; and we do hereby declare that the following description and accompanying drawings are sufficient to enable any person skilled in the art or science to which it most nearly appertains, to make and use our said invention or improvement, without further invention or experiment.

The nature of our invention and improvement consists in the peculiar construction and arrangement of devices, described and claimed in the following specification, and represented in the drawings.

Referring to the accompanying drawings, and letters of reference marked thereon, for a better understanding of our invention—

A is the head of the fork, and is made of steel, or other suitable material.

This head we make tubular, and fill with a piece or pieces of wood, *a*.

By making the head hollow or tubular, we secure strength, with lightness, and by filling it with wood we prevent it from collapsing or being indented when it is subjected to a strain, either from working the fork or keying the bands or clips B B B to it.

The bands or clips B are made of metal, and of an oval or other suitable form, and are slipped over the tubular head A to their respective places, and a metal pin or key, *e*, driven firmly in between the head and clip, at that part of the oval which is the smallest, thus binding the two strongly and firmly together.

Formed on the upper side of each of the clips to which the tines are to be attached, is a square box, C, provided with a square socket, through which the but ends of the tines D D are passed after being reduced to the proper size, and are held by a nut, *d*.

These sockets are so arranged, that in order to allow the tines to pass through them, the portion of the head forming their lower side must be filed or made flat, as shown in the drawings, fig. 1, and thus, when the tines are secured by the nuts on their ends, they bear upon the flat portion of the head, and prevent the clips from turning when the fork is loaded.

The clip to which the handle E is secured, being in the middle, is the first to be attached, which may be done by heating and shrinking, or keying, as above described.

By this construction and arrangement, strength is combined with lightness.

The tubular metal head, when filled with wood, will withstand any strain that the fork is ordinarily subjected to, either upon the tines or head itself, while the bands to which the tines are secured can, by no possibility, turn when they are loaded, as the bearing of the tines upon the flat surface in the sockets will effectually prevent it; and should any portion become broken, it can easily be removed and a perfect part substituted for it.

Having thus described our invention,

What we claim, and desire to secure by Letters Patent, is—

Fastening the teeth to the head by the band or clip B, provided with a socket, C, and a score in the head A for the shank of the tooth D, so arranged that the shank prevents the clip from turning on the head A, substantially as shown and described.

In witness whereof, we have hereto set our hands and seals.

ELISHA WIARD WALTON. [L. S.]
ANDREW JACKSON BROWN. [L. S.]

Witnesses:
F. C. LAWRENCE,
R. W. BRUSH.